US009312988B2

(12) United States Patent
Singh et al.

(10) Patent No.: US 9,312,988 B2
(45) Date of Patent: Apr. 12, 2016

(54) REDUNDANT TRANSMISSION OF REAL TIME DATA

(71) Applicant: Apple Inc., Cupertino, CA (US)

(72) Inventors: Ajoy K. Singh, Milpitas, CA (US); Vinay R. Majjigi, Sunnyvale, CA (US); Christian W. Mucke, Sunnyvale, CA (US); Tarik Tabet, Los Gatos, CA (US); Paul V. Flynn, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 14/187,988

(22) Filed: Feb. 24, 2014

(65) Prior Publication Data
US 2014/0241243 A1    Aug. 28, 2014

Related U.S. Application Data

(60) Provisional application No. 61/771,027, filed on Feb. 28, 2013.

(51) Int. Cl.
*H04L 1/00* (2006.01)
*H04L 1/08* (2006.01)

(52) U.S. Cl.
CPC ........................................ *H04L 1/08* (2013.01)

(58) Field of Classification Search
CPC ......... H04L 65/00; H04L 65/01; H04L 65/02; H04L 65/03; H04L 2012/64; H04L 2012/65; H04L 2012/66; H04L 2012/67; H04L 12/6418; H04L 12/6419; H04L 12/642
USPC .................................................. 370/352–356
See application file for complete search history.

(56) References Cited

U.S. PATENT DOCUMENTS

| 2005/0166123 A1 | 7/2005 | Yanamoto et al. |
| 2007/0133515 A1* | 6/2007 | Kumar ................... H04L 1/0014 370/352 |
| 2010/0166006 A1 | 7/2010 | Xu |
| 2012/0140743 A1* | 6/2012 | Pelletier ............ H04W 72/0453 370/335 |
| 2012/0218970 A1 | 8/2012 | Westberg et al. |
| 2012/0327779 A1 | 12/2012 | Gell et al. |

FOREIGN PATENT DOCUMENTS

| JP | 2005210219 | 8/2005 |
| JP | 2009260719 | 11/2009 |

OTHER PUBLICATIONS

Sjoberg et al., Apr. 2007, "RTP Payload Format and File Storage Format for the Adaptive Multi-Rate (AMR) and Adaptive Multi-Rate Wideband (AMR-WB) Audio Codecs," RFC 4867.
3GPP TS 36.213, Dec. 2012, "Evolved Universal Terrestrial Radio Access (E-UTRA); Physical layer procedures," 3rd Generation Partnership Project (3GPP), Version 10.8.0.
PCT Application No. PCT/US2014/017919—International Search Report & Written Opinion dated May 29, 2014.

\* cited by examiner

*Primary Examiner* — Dady Chery
(74) *Attorney, Agent, or Firm* — Downey Brand LLP

(57) ABSTRACT

A method for redundant transmission of real time data is provided. The method can include an edge node in a wireless network sending a first RTP packet including a first real time data frame to a second edge node. The method can further include the edge node determining that a radio link condition is sufficient to support redundant transmission of real time data to the second edge node. The method can additionally include the edge node, in response to determining that the radio link condition is sufficient to support redundant transmission of real time data, bundling the first real time data frame with a next sequential real time data frame that has not been previously sent to the second edge node in a second RTP packet at a PDCP layer of the edge node; and sending the second RTP packet to the second edge node.

20 Claims, 10 Drawing Sheets

| AMR-WB | Speech Frame Size (bits) | RTP Payload Size (bits) | MAC/RLC/PDCP Header Size (bits) | ROHC Header Size (bits) | Minimum TB size to Support Single Speech Frame (bits) | Nearest Available TB size to Support Single Speech Frame (bits) | Minimum TB size to Support Speech Frame Redundancy (bits) | Nearest Available TB size to Support Speech Frame Redundancy (bits) | Modification of allocated MCS to Support Speech Frame Redundancy |
|---|---|---|---|---|---|---|---|---|---|
| 6.6 Kbps | 136 | 144 | 24 | 24 | 192 | 224 (2RB) | 192+136+6 = 336 | 376 (2PRB) | MCS 7 for single frame<br>MCS 11 for two frames |
| 8.85 Kbps | 184 | 192 | 24 | 24 | 240 | 256 (2RB) | 240+184+6 = 430 | 440 (2PRB) | MCS 8 for single frame<br>MCS 12 for two frames |
| 12.65 Kbps | 256 | 264 | 24 | 24 | 312 | 328 (2RB) | 312+256+6 = 574 | 600 (2PRB) | MCS 10 for single frame<br>MCS 15 for two frames |

FIG. 5

| CMR (4 bits) 602 | ToC 1 (6 bits) 604 | ToC 2 (6 bits) 606 | Real Time Data 608 | Padding 610 |

FIG. 6

| CMR (4 bits) 702 | Padding (4 bits) 704 | ToC 1 (6 bits) 706 | Padding (2 bits) 708 | ToC 2 (6 bits) 710 | Padding (2 bits) 712 | Real Time Data 714 | Padding 716 |

FIG. 7

REDUNDANT TRANSMISSION OF REAL TIME DATA

CROSS-REFERENCE TO RELATED APPLICATION

This application claims the benefit of priority from U.S. Provisional Patent Application No. 61/771,027, filed on Feb. 28, 2013, which is hereby incorporated herein by reference in its entity.

FIELD

The described embodiments relate generally to wireless communications technology. More particularly, the present embodiments relate to redundant transmission of real time data.

BACKGROUND

Real time data can be transmitted in transport blocks between edge nodes in a cellular communication system. In real time sessions, such as Voice over Internet Protocol (VoIP) sessions, video streaming, video conferencing, and the like, it is important to maintain continuity. In this regard, dropped or delayed packets can result in interruptions that negatively impact the user experience.

Real time data frames are encapsulated in packets corresponding to transport block (TB) size. The TB size can be defined based at least in part on resources assigned by a serving base station in a cellular network. For example, an evolved Node B (eNB) in a Long Term Evolution (LTE) network can assign a number of physical resource blocks (PRBs) (e.g., 1, 2, 3, or 4) and a modulation and coding scheme (MCS) level, which can, together, define a specific TB size that can be used for real time data exchange over a radio link between a wireless communication device and the eNB.

Various transport block sizes can be supported depending on the number of PRBs used for communication with a wireless communication device. For example using 2 PRBs, the eNB scheduler can package between 32 bits and 1480 bits in a single transport block. The eNB can decide to select a specific TB size depending on available user data and a radio link condition of the radio link with the wireless communication device. Transport block sizes have limited granularity. As such, when an edge node, such as a base station or wireless communication device is packaging a real time data packet in a transport block, there may be unused space in the transport block.

SUMMARY

Some example embodiments facilitate maintenance of continuity in real time data sessions by providing for redundant transmission of real time data. More particularly, some example embodiments take advantage of unused space in a transport block that would otherwise be wasted to bundle two or more real time data frames. For example, in some such embodiments, two consecutive data frames, including a previously sent real time data frame and a next sequential unsent real time data frame, can be bundled into a single packet. As such, if a prior packet containing the previously sent real time data frame was dropped or received in error, the redundant transmission of the previously sent real time data frame can support session continuity without necessitating network overhead retransmission, as the previously sent real time data frame can be redundantly sent in transport block space that would otherwise go unused.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which:

FIG. 5 illustrates a table illustrating correlation between real time speech frame size and MCS level sufficient to support redundant speech frame transmission according to some example embodiments;

FIG. 6 illustrates an example packet format for redundant transmission of real time data according to some example embodiments;

FIG. 7 illustrates another example packet format for redundant transmission of real time data according to some example embodiments;

DETAILED DESCRIPTION

Figure 1:
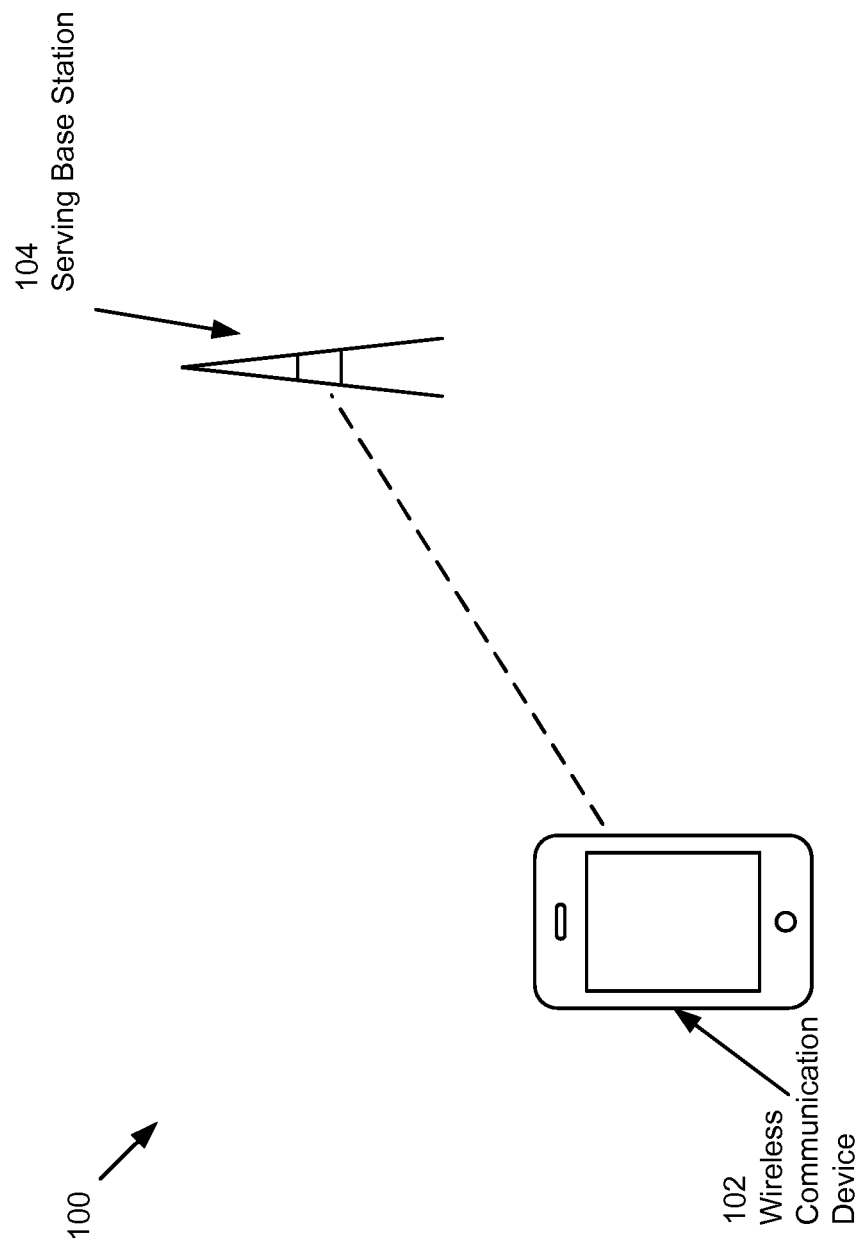
FIG. 1 illustrates a wireless communication system in accordance with some example embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As discussed above, it is critical to maintain continuity in real time data sessions, such as VoIP sessions, video conferencing sessions, and the like, as dropped or delayed packets can result in interruptions that negatively impact the user experience. Some example embodiments facilitate maintenance of continuity in real time data sessions by providing for redundant transmission of real time data. In this regard, some example embodiments take advantage of unused space in transport blocks that would otherwise be wasted to bundle two or more real time data frames, including one or more data frames that have been previously sent and one or more data frames that have not been previously sent. For example, in some embodiments two consecutive data frames, including a previously sent real time data frame and a next sequential unsent real time data frame, can be bundled into a single packet. Accordingly, such example embodiments can provide for redundant transmission of a previously sent real time data frame in case the frame is lost or corrupted in transmission.

Such example embodiments can take advantage of the substantially static size of a real time data frame. In this regard, given a particular codec, frame sizes for real time data, such as voice frames for VoIP sessions and video frames for video streaming and video conferencing sessions, tend to be fairly static. For example, VoIP sessions in LTE networks, referred to as Voice over LTE (VoLTE) can use various codecs, such as AMR-NB (AMR-Narrow Band), which can have a rate of up to 12.2 kilobits per second (kbps) at full rate. As another example, VoLTE can use AMR-WB (AMR-Wide Band) codec, which can, for example, utilize a bit rate of 12.65 kbps, which can provide a comparable bit rate to the 12.2 kbps rate that can be used with AMR-NB. As such, the size of a given real time data frame can be a constant that can be known to an edge node, such as a wireless communication device or base station, participating in a real time data session. It will be appreciated that the use of 12.2 kbps and 12.65 kbps encoded audio data are provided as non-limiting examples of bit rates that are commonly used with adaptive multi-rate (AMR) audio codecs. In this regard, it will be appreciated that embodiments disclosed herein can be applied in conjunction with codecs in addition to or in lieu of AMR codecs, with bit rates other than 12.2 kbps and 12.65 kbps, and/or with real time video data and/or other forms of real time data in addition to audio data.

In accordance with some example embodiments, if the radio link condition is sufficient to enable redundant transmission of real time data, an edge node of a wireless access network (e.g. a base station or wireless communication device) can take advantage of unused bits of a transport block to redundantly transmit real time data. For example, if the radio link condition is sufficient such that an MCS level that can support a transport block size that is determined to be large enough to encapsulate two or more real time data frames for a real time data session based on a known size of a frame given a codec being used can be assigned, an edge node can take advantage of the unused bits of the allocated transport block size to support opportunistic application layer redundancy of real time data.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 illustrates a wireless communication system 100 in accordance with some example embodiments. In this regard, FIG. 1 illustrates a wireless network (e.g., a wireless access network, such as a cellular access network), including edge nodes that can participate in a real time data session, such as, by way of non-limiting example, a real time audio session, such as a VoLTE call and/or other VoIP session; a real time video session which may additionally include real time audio, such as a video conferencing session, real time video streaming, and/or the like; and/or other real time data session. The edge nodes in the system 100 can include a wireless communication device 102 and a serving base station 104, which can provide network access to the wireless communication device 102 via a radio link.

By way of non-limiting example, the wireless communication device 102 can be embodied as a cellular phone, such as a smart phone device, a tablet computing device, a laptop computing device, or other computing device that can be configured to access a cellular network via a serving base station 104. The serving base station 104 can comprise any cellular base station dependent on a type(s) of radio access technology (RAT) used by the wireless access network of the system 100. By way of non-limiting example, the serving base station 104 can be a base station (BS), base transceiver station (BTS), node B, evolved Node B (eNB), a home eNB, femtocell, picocell, some combination thereof, and/or other type of base station.

The wireless access network of the system 100 can implement any of a variety of cellular RATs that can be supported by the wireless communication device 102 and/or serving base station 104. By way of non-limiting example, the wireless access network can implement fourth generation (4G) cellular RAT, such as a Long Term Evolution (LTE) RAT, including LTE, LTE-Advanced (LTE-A), and/or other present or future developed LTE RAT. As another example, in some embodiments, the wireless access network can implement a third generation (3G) RAT, such as a Universal Mobile Telecommunications System (UMTS) RAT, such as Wideband Code Division Multiple Access (WCDMA) or Time Division Synchronous Code Division Multiple Access (TD-SCDMA); a CDMA2000 RAT (e.g., 1xRTT) or other RAT standardized by the Third Generation Partnership Project 2 (3GPP2); and/or other 3G RAT. As a further example, in some embodiments, the wireless access network can implement a second generation (2G) RAT, such as a Global System for Mobile Communications (GSM) RAT, and/or other 2G RAT. It will be appreciated, however, that the foregoing examples of cellular RATs are provided by way of example, and not by way of limitation. In this regard, other present or future developed cellular RATs, including various fifth generation (5G) RATs now in development, can be used to support communication between the wireless communication device 102 and serving base station 104 within the scope of the disclosure.

Figure 2:
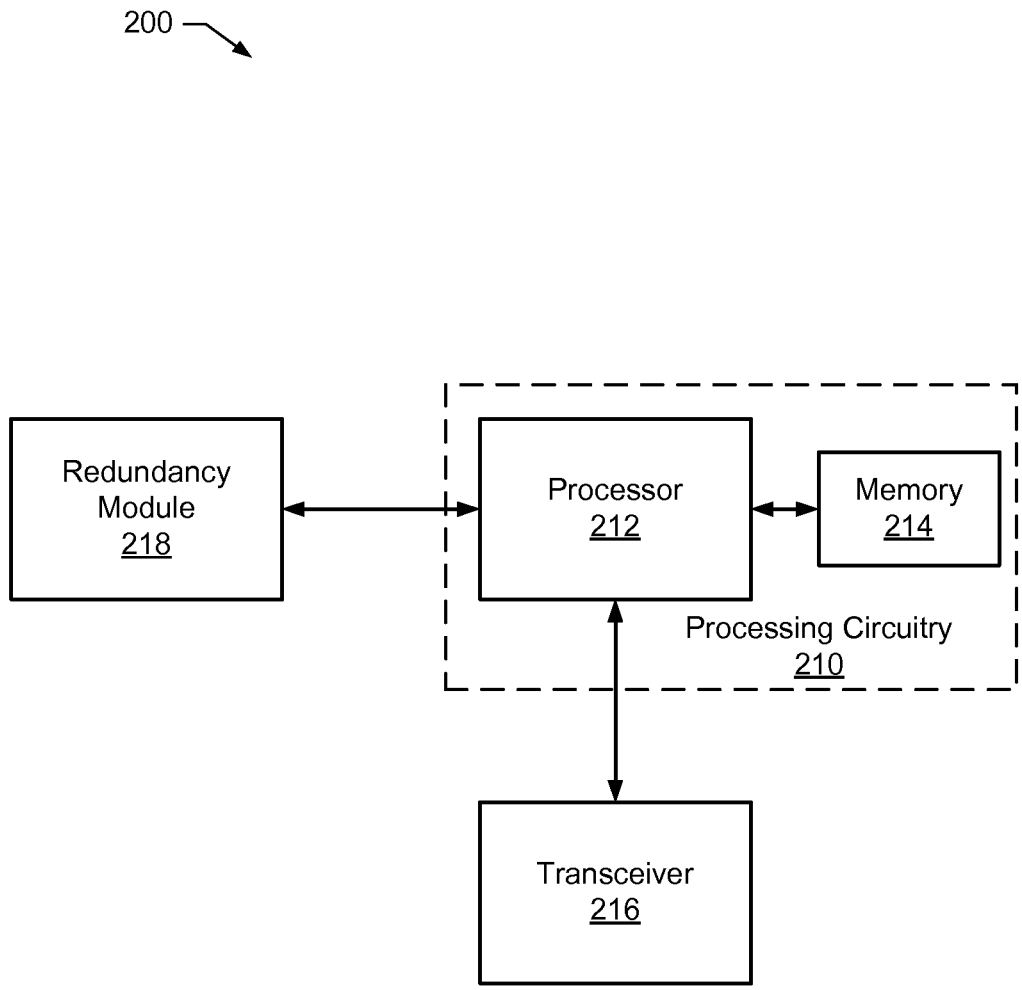
FIG. 2 illustrates a block diagram of an apparatus that can be implemented on a wireless communication device operating as an edge node in a wireless communication network in accordance with some example embodiments.

FIG. 2 illustrates a block diagram of an apparatus 200 that can be implemented on a wireless communication device, such as wireless communication device 102, operating as an edge node in a wireless communication network in accordance with some example embodiments. In this regard, when implemented on a computing device, apparatus 200 can enable the computing device to operate as a wireless communication device 102 configured to support redundant transmission of real time data within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the wireless communication device 102 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a single chip or chipset. In some example embodiments in which one or more components of the apparatus 200 are embodied as a chipset, the chipset can be capable of enabling a computing device to operate as a wireless communication device 102 in the system 100 when implemented on or otherwise operably coupled to the computing device. Thus, for example, one or more components of the apparatus 200 can provide a chipset, such as a cellular baseband chipset, configured to enable a computing device to operate over one or more cellular networks, such as by accessing serving base station 104.

In some example embodiments, the processing circuitry 210 can include a processor 212 and, in some embodiments, such as that illustrated in FIG. 2, can further include memory 214. The processing circuitry 210 can be in communication with or otherwise control transceiver 216 and/or redundancy module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of a wireless communication device as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver 216, or redundancy module 218 via one or more buses for passing information among components of the apparatus 200.

The apparatus 200 can further include transceiver 216. The transceiver 216 can enable the apparatus 200 to send wireless signals to and receive signals from one or more wireless networks. As such, the transceiver 216 can be configured to support any type of RAT that may be implemented by the system 100. Accordingly, the transceiver 216 can be configured to enable the wireless communication device 102 to establish and communicate via a radio link with the serving base station 104.

The apparatus 200 can further include redundancy module 218. The redundancy module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the redundancy module 218. The redundancy module 218 can be configured to selectively implement a real time data redundancy scheme in accordance with one or more example embodiments, as described further herein.

The redundancy module 218 can be configured in some example embodiments to determine that a radio link condition associated with a radio link between the wireless communication device 102 and serving base station 104 is sufficient to support redundant transmission of real time data (e.g., to support enablement of a real time data redundancy scheme in accordance with various example embodiments). For example, the redundancy module 218 can be configured to determine that an MCS level sufficient to support a transport block size large enough to bundle two or more real time data frames of a size being used in a real time data session without using an additional PRB has been allocated to the wireless communication device 102 (e.g., by the serving base station 104).

In an instance in which the redundancy module 218 determines that a radio link condition is sufficient to support redundant transmission of real time data, the redundancy module 218 can begin redundant real time data packet transmission by bundling real time data frames in accordance with various example embodiments. In this regard, the redundancy module 218 can be configured to bundle (e.g., encapsulate) one or more real time data frames that have been previously sent to the serving base station 104 with one or more real time data frames (e.g., one or more next sequential real time data frames) that have not been previously sent to the serving base station 104 (e.g., new real time data frames) in a real-time transport protocol (RTP) packet.

Accordingly, a given real time data frame can be redundantly transmitted in two or more RTP packets. Thus, for example, a first RTP packet can include frame $f_0$ and frame $f_1$, wherein frame $f_0$ was transmitted in a prior RTP packet and frame has not been previously sent to the serving base station 104. A second RTP packet that can be transmitted after the first RTP packet can, for example, in turn include frame $f_1$ and frame $f_2$, which has not been previously sent to the serving base station 104.

Figure 3:
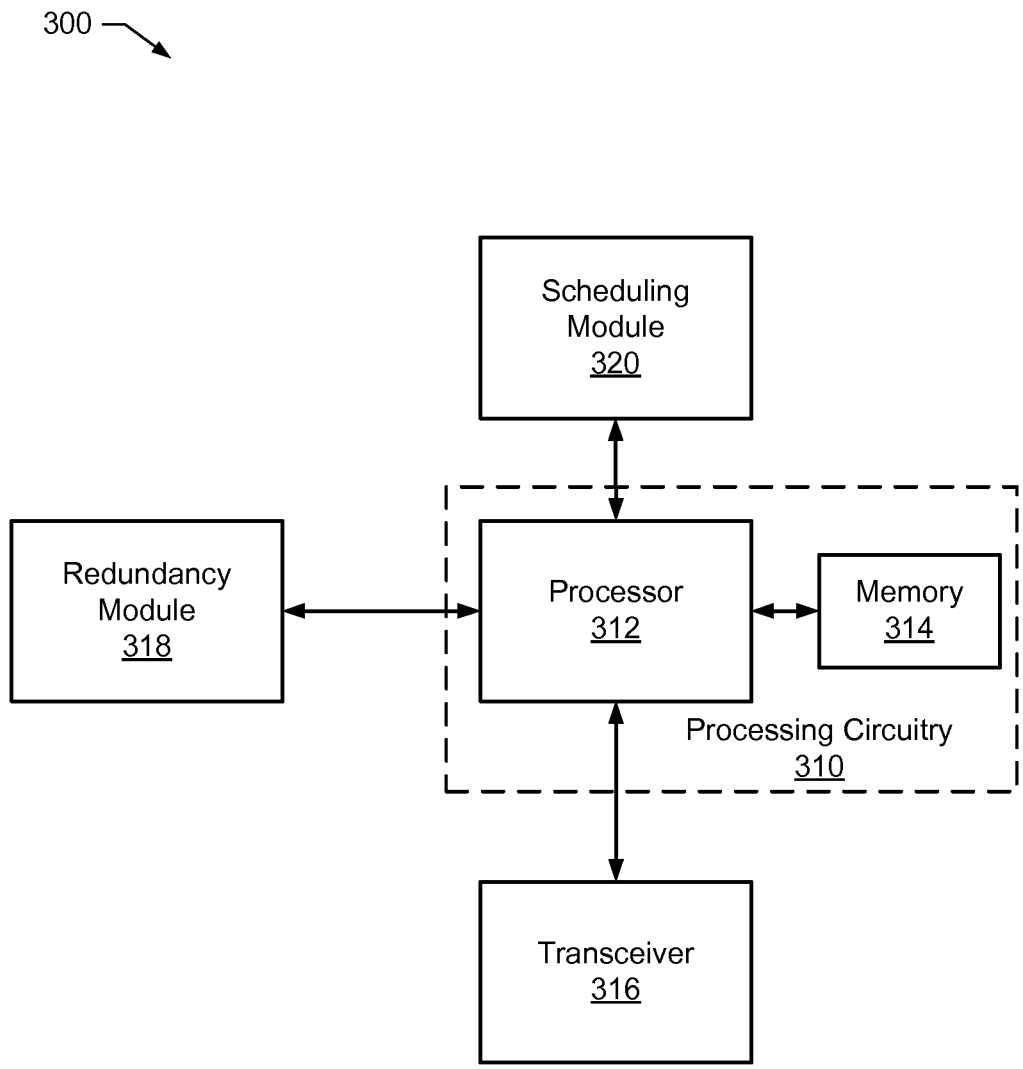
FIG. 3 illustrates a block diagram of an apparatus that can be implemented on a base station in a wireless communication network in accordance with some example embodiments

FIG. 3 illustrates a block diagram of an apparatus 300 that can be implemented on a base station, such as serving base station 104, in a wireless communication network in accordance with some example embodiments. In this regard, when implemented on a base station, the apparatus 300 can enable the base station to support redundant transmission of real time data in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the serving base station 104 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset. In some example embodiments in which one or more components of the apparatus 300 are embodied as a chipset, the chipset can be capable of enabling a computing device to operate as a serving base station 104 in the system 100 when implemented on or otherwise operably coupled to the computing device.

In some example embodiments, the processing circuitry 310 can include a processor 312 and, in some embodiments, such as that illustrated in FIG. 3, can further include memory 314. The processing circuitry 310 can be in communication with or otherwise control a transceiver 316, redundancy module 318, and/or scheduling module 320.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be embodied on a single computing device, or can be distributed across a plurality of computing devices that can collectively perform the functionality of one or more entities of a wireless access network, including serving base station 104. The plurality of processors can be in operative communication with each other and can be collectively configured to perform one or more functionalities of the serving base station 104 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. In embodiments including a plurality of memory devices, the memory devices can be embodied on a single computing device, or can be distributed across a plurality of computing devices that can collectively perform the functionality of one or more entities of a wireless access network, including serving base station 104. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver 316, redundancy module 318, or scheduling module 320, such as via one or more buses for passing information among components of the apparatus 300.

The apparatus 300 can further include transceiver 316. The transceiver 316 can enable the apparatus 300 to send wireless signals to and receive signals from one or more wireless communication devices, such as wireless communication device 102. Thus, for example, the transceiver 316 can be configured to support establishment of and communication via a radio link with the wireless communication device 102. The transceiver 316 can accordingly be configured to support communication in accordance with any RAT that can be implemented by the system 100.

The apparatus 300 can further include redundancy module 318. The redundancy module 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the redundancy module 318. The redundancy module 318 can be configured to selectively implement a real time data redundancy scheme in accordance with one or more example embodiments, as described herein.

The apparatus 300 can additionally include scheduling module 320. The scheduling module 320 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the scheduling module 320. The scheduling module 320 can be configured to implement a scheduler that may be used to schedule and/or otherwise allocate radio link resources for one or more wireless communication devices, such as wireless communication device 102 that can be served by the serving base station 104. Thus, for example, the scheduling module 320 can be configured to allocate a transport block size for use in communication with the wireless communication device 102, such as through MCS allocation and/or PRB allocation.

In some example embodiments, the redundancy module 318 can be configured to determine that a radio link condition is sufficient to support redundant transmission of real time data (e.g., to support enablement of a real time data redundancy scheme in accordance with various example embodiments) to and/or from the wireless communication device 102. For example, the redundancy module 318 can be configured to determine that an MCS level sufficient to support a transport block size large enough to bundle two or more real time data frames of a size being used in a real time data session without using an additional PRB has been allocated to the wireless communication device 102.

Additionally or alternatively, the redundancy module 318 of some example embodiments can be configured to determine that the radio link condition is sufficient to enable the serving base station 104 to allocate the wireless communication device 102 with an MCS level sufficient to provide a transport block size large enough to package multiple real time data frames. This determination may, for example, be based on loading on the serving base station 104, available radio link resources, channel conditions that can be reported by the wireless communication device 102, and/or other radio link conditions that can be factored into MCS allocation decisions.

In an instance in which the redundancy module 318 determines that radio link condition permits allocation of an appropriate MCS level, the scheduling module 320 (e.g., a scheduler that can be associated with the serving base station 104) and/or a schedule that can be associated with another network entity can be configured to select a transport block size for media access control (MAC) packet data units (PDUs) for uplink and/or downlink communication with the wireless communication device 102 that can be of a sufficient size to support real time data redundancy via packaging a payload of two or more real time data frames within a single RTP packet. For example, the scheduling module 320 can allocate the wireless communication device 102 with a higher MCS level, which can provide a larger transport block size, when the redundancy module 318 determines that radio link conditions permit the use of a higher MCS level.

Given a sufficient transport block size for use in downlink communications that can be sent to the wireless communication device 102 by the serving base station 104, the redundancy module 318 can be configured to perform redundant transmission of real time data. In this regard, the redundancy module 318 can be configured to bundle (e.g., encapsulate) one or more real time data frames that have been previously sent to the wireless communication device 102 with one or more real time data frames (e.g., one or more next sequential real time data frames) that have not been previously sent to the wireless communication device 102 (e.g., new real time data frames) in a real-time transport protocol (RTP) packet. This redundant transmission of real time data by the redundancy module 318 can be performed in a substantially similar manner as described above with respect to the redundancy module 218 that can be associated with the wireless communication device 102.

Redundant real time data transmission can accordingly be initiated and supported by any edge node that can be involved in a real time data session. Thus, it will be appreciated that in accordance with some example embodiments, redundant real time data transmission can be initiated and/or used by the wireless communication device 102 and/or serving base station 104, radio link conditions permitting.

Figure 4:
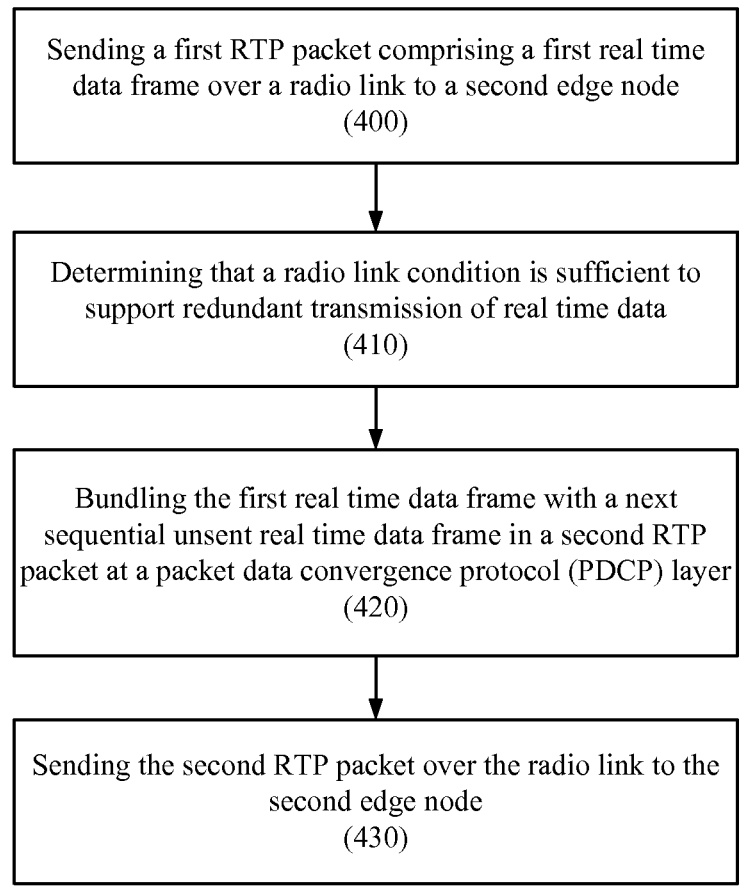
FIG. 4 illustrates a flow chart according to an example method for redundant transmission of real time data in accordance with some example embodiments.

FIG. 4 illustrates a flow chart according to an example method for redundant transmission of real time data in accordance with some example embodiments. In this regard, FIG. 4 illustrates a method that can be performed by an edge node device, such as wireless communication device 102 and/or serving base station 104, participating in a real time data session. One or more of processing circuitry 210, processor 212, memory 214, transceiver 216, redundancy module 218, processing circuitry 310, processor 312, memory 314, transceiver 316, redundancy module 318, or scheduling module 320 can, for example, provide means for performing the operations illustrated in and described with respect to FIG. 4.

Operation 400 can include an edge node sending a first RTP packet comprising a first real time data frame over a radio link to a second edge node. Thus, for example, operation 400 can include the wireless communication device 102 sending the first RTP packet to the serving base station 104, or vice versa. The first real time data frame can comprise any real time data, such as, real time audio, real time video, some combination thereof, and/or some other form of real time data for a real time data session in which the edge nodes may be participating. The first RTP packet can be a packet for any real time data session, such as, by way of non-limiting example, a real time audio session (e.g., a VoLTE call or other VoIP session), a real time video session (e.g., a video call, video conference, real time streaming video, and/or the like), and/or other real time data session.

Operation 410 can include determining that a radio link condition of the radio link between the wireless communication device 102 and serving base station 104 is sufficient to support enablement of the real time data redundancy scheme. For example, in some embodiments, operation 410 can include the wireless communication device 102 and/or serving base station 104 determining that a configured MCS level provides a transport block size sufficient to enable bundling two or more real time data frames. As another example, in some embodiments, operation 410 can include the serving base station 104 determining that radio link conditions permit allocating the wireless communication device 102 with an MCS level for uplink and/or downlink communication that provides a transport block size that is large enough to enable bundling two or more real time data frames.

The size of a transport block that is large enough to enable bundling of at least two real time data frames can depend based at least in part on a type of real time data being transmitted as well as a codec being used for the real time data. As an example, using real time speech frames, such as for a VoLTE or other VoIP session, encoded with AMR-WB codec, FIG. 5 illustrates a table illustrating various examples of TB sizes and MCS levels for supporting real time redundancy for real time speech frames in accordance with some example embodiments in which two real time speech frames (e.g., one speech frame that has been previously sent and one new speech frame) can be packaged in a single RTP packet. Thus, for example, given real time speech frames encoded with AMR-WB at a rate of 12.65 kilobits per second (Kbps), the speech frame size can be 256 bits. Factoring in total RTP payload size and header size, the minimum transport block size needed to support packaging of a single speech frame can be 312 bits. The nearest available transport block size can be 328 bits, which can be formed by two resource blocks (RBs) and can be afforded by an MCS level of 10. Thus, if a data redundancy scheme is to be enabled such that an additional 256 bit frame is to be packaged in a packet along with padding (e.g., 6 bits), a minimum transport block size that can be needed to support redundancy can be 574 bits. The nearest available transport block size can be 600 bits, which can be afforded by an MCS level of 15. As such, while an MCS level of 10 may be needed for transmission of a single real time speech frame encoded with AMR-WB at 12.65 Kbps, an MCS level of 15 may be needed to support redundant transmission using AMR-WB at 12.65 Kbps. Similar examples are illustrated in FIG. 5 for AMR-WB at 6.6 Kbps and 8.85 Kbps. Accordingly, it can be seen that an edge node, such as wireless communication device 102 and/or serving base station 104, can use a known real time data frame size given a codec being used to calculate whether channel conditions are sufficient to support enabling redundancy for real time data frames. In this regard, it will be appreciated that similar calculations can be determined for other codecs and/or other types of real time data, such as real time video data.

In some example embodiments, operation 410 can be performed at a packet data convergence protocol (PDCP) layer of the edge node. In this regard, knowledge of whether there is head room (e.g., sufficient unused bits in the TB) in the physical layer can be used at the link layer to determine to implement the data redundancy scheme and perform redundant transmission of real time data.

In some example embodiments, as discussed above, the serving base station 104 can be configured to facilitate enablement of transmission of redundant real time data by actively configuring a sufficient transport block size when radio link conditions permit. Thus, for example, using the example of FIG. 5, the scheduler can allocate a transport block size of 600 bits instead of 328 to accommodate VoIP speech frame redundancy if a radio link condition permits the wireless communication device 102 to send a 600 bit MAC packet data unit (PDU) within a desired frame error rate (FER) target.

Some example embodiments can optionally include discontinuing use of hybrid automatic repeat request (HARQ) attendant to enabling the real time data redundancy scheme. In this regard, HARQ may not be needed when using redundant transmission in accordance with some example embodiments, as a redundant copy of an immediately previously sent real time data frame can be bundled with a transmission of a next sequential real time data frame. If, however, there is packet loss when performing redundant transmission of real time data, radio link control acknowledge mode (RLC-AM) can be used to recover from packet loss of best effort application traffic when HARQ is disabled. Disabling HARQ retransmissions can further provide a benefit of reducing channel overhead by reducing transmissions on the channel. In some example embodiments, the serving base station 104 can disable HARQ retransmissions prior to enabling application layer redundancy (e.g., through allocation of an MCS level sufficient to enable performing redundant transmission of real time data on the uplink and/or downlink). However, it will be appreciated that HARQ retransmissions can be disabled concurrent with or after enabling redundancy (e.g., concurrent with or after beginning to perform redundant transmission of real time data) in some example embodiments. In embodiments disabling HARQ attendant to enabling the real time data redundancy scheme, the serving base station 104 can, for example, be configured to disable HARQ via a radio resource control (RRC) reconfiguration message that can be sent to the wireless communication device 102.

In some example embodiments, an edge node can enable the real time redundancy scheme without signaling or otherwise negotiating enablement of the redundancy scheme with another edge node. In this regard, in such embodiments, an edge node can begin to perform redundant transmission of real time data given a sufficient transport block size without notifying the edge node to which the real time data is being transmitted.

Additionally or alternatively, in some example embodiments, an edge node can provide an indication to the second edge node that the edge node is going to perform redundant transmission of real time data prior to sending an RTP packet including a redundant transmission. For example, the indication can be provided through explicit signaling or a negotiation process. As still a further example, the indication can be included within an RTP packet and/or other packet (e.g., in a flag bit, header indication, and/or the like that can be carried by the packet), which can be transmitted for the real time data session.

In some example embodiments, the wireless communication device 102 and serving base station 104 can negotiate support for redundant transmission of real time data prior to either performing redundant transmission of real time data. For example, an edge node can provide an indication, such as in a capabilities message, to the other edge node as to whether redundant transmission of real time data is supported by the edge node. This indication can, for example, be exchanged attendant to establishment of the real time data session and/or when the wireless communication device 102 registers to (e.g., camps on) the serving base station 104 and/or to the serving network comprising the serving base station 104.

Referring again to FIG. 4, operation 420 can include bundling (e.g., encapsulating) the first real time data frame that was sent in the first RTP packet in operation 400 with a next sequential unsent real time data frame in a second RTP packet. Operation 420 can be performed at a PDCP layer of the edge node. The PDCP layer can accordingly modify the content of the RTP header to support inclusion of an additional (e.g., the redundant) real time data frame. In order to support the redundancy, the previously sent real time data frame (e.g., the first real time data frame) can be stored by the edge node, such as in a buffer, so that it is maintained for packaging with the next sequential real time data frame. Thus, for example, RTP frame 0, which, for proposes of example, has been previously sent, can be packaged with the next sequential RTP frame, RTP frame 1, to provide for redundant transmission of RTP frame 0. RTP frame 1 can, in turn, be packaged with the next sequential RTP frame, RTP frame 2, to provide for redundant transmission of RTP frame 1, and so on.

It will be appreciated that while the foregoing example has been described with respect to bundling two real time data frames (e.g., one previously sent real time data frame and the next sequential unsent real time data frame) in an RTP packet, some example embodiments can be extended to bundling three or more real time data frames in an RTP packet given a sufficient transport block size. For example, in such embodiments, if the transport block size is sufficient, two or more previously sent real time data frames and/or two or more new real time data frames that have not been previously sent may be bundled in an RTP packet.

In some example embodiments, the real time data frames can be bundled into the payload of an RTP packet (e.g., at the PDCP layer prior) prior to compressing the header of the modified packet. For example, the frames can be bundled prior to compressing an RTP/UDP/IP (Real-time Transport Protocol/User Datagram Protocol/Internet Protocol) header. Further, in some example embodiments, the header of the RTP packet can be modified to support bundling. As an example, the header can be modified to include an additional table of contents (ToC) field for the redundant data frame, such that the header can include a ToC field for each real time data frame (e.g., each redundant real time data frame and each new real time data frame) that may be included in the RTP packet. Additionally, in some example embodiments, any checksums, such as UDP and/or IP layer checksums, that can be included in the header can be recalculated after bundling has been performed.

Operation 430 can include sending the second RTP packet including the previously sent first real time data frame and the next sequential unsent real time data frame over the radio link to the second edge node.

It will be appreciated that any of a variety of RTP packets can be used for redundant transmission in accordance with various example embodiments. FIG. 6 illustrates one such example packet format in which a Bandwidth-Efficient (BE) payload format can be used for redundant transmission of real time data frames. In the example of FIG. 6, a first ToC field 604 can be used for a first real time data frame and a second ToC field (ToC 2) 606 can be added to support the second real time data frame. The ToC field 604 and ToC field 606 can, for example, each be 6 bits. However, it will be appreciated that other sizes of ToC fields may be used within the scope of the disclosure. Both the new and the redundant real time data frames can be included in the real time data field 608 of the packet. The example of FIG. 6 may additionally include a codec mode request (CMR) field 602, which may, for example, be 4 bits. It will be appreciated, however, that other sizes of CMR fields are contemplated within the scope of the disclosure. In some example embodiments, padding 610 may also be included. However, the size of the padding 610 may vary depending on the transport block size and, in some cases may be omitted. It will be appreciated that the example format illustrated in FIG. 6 may be extended mutatis mutandis to embodiments in which three or more real time data frames may be packaged in an RTP packet.

FIG. 7 illustrates another example packet format in which an Octet-Aligned (OA) payload format can be used for redundant transmission of real time data frames. In the example of FIG. 7, a second ToC field (ToC 2) 710 and appropriate padding (field 712) can be added to support the second real time data frame. In this regard, a first ToC field (ToC 1) 706 may be used for the first real time data frame and the second ToC field 710 may be used for the second real time data frame. Both the new and the redundant real time data frames can be included in the real time data field 714 of the packet. The packet may additionally include a CMR field 702, which may, for example, be 4 bits. It will be appreciated, however, that other sizes of CMR fields are contemplated within the scope of the disclosure. The padding fields 704, 712, and 716 may be used to provide for octet alignment and may, for example, vary in size depending on the transport block size. Where not needed to support octet alignment (e.g., depending on the transport block size), one or more of the padding fields 704, 712, and 716 may be omitted. It will be appreciated that the example format illustrated in FIG. 7 may be extended mutatis mutandis to embodiments in which three or more real time data frames may be packaged in an RTP packet.

Figure 8:
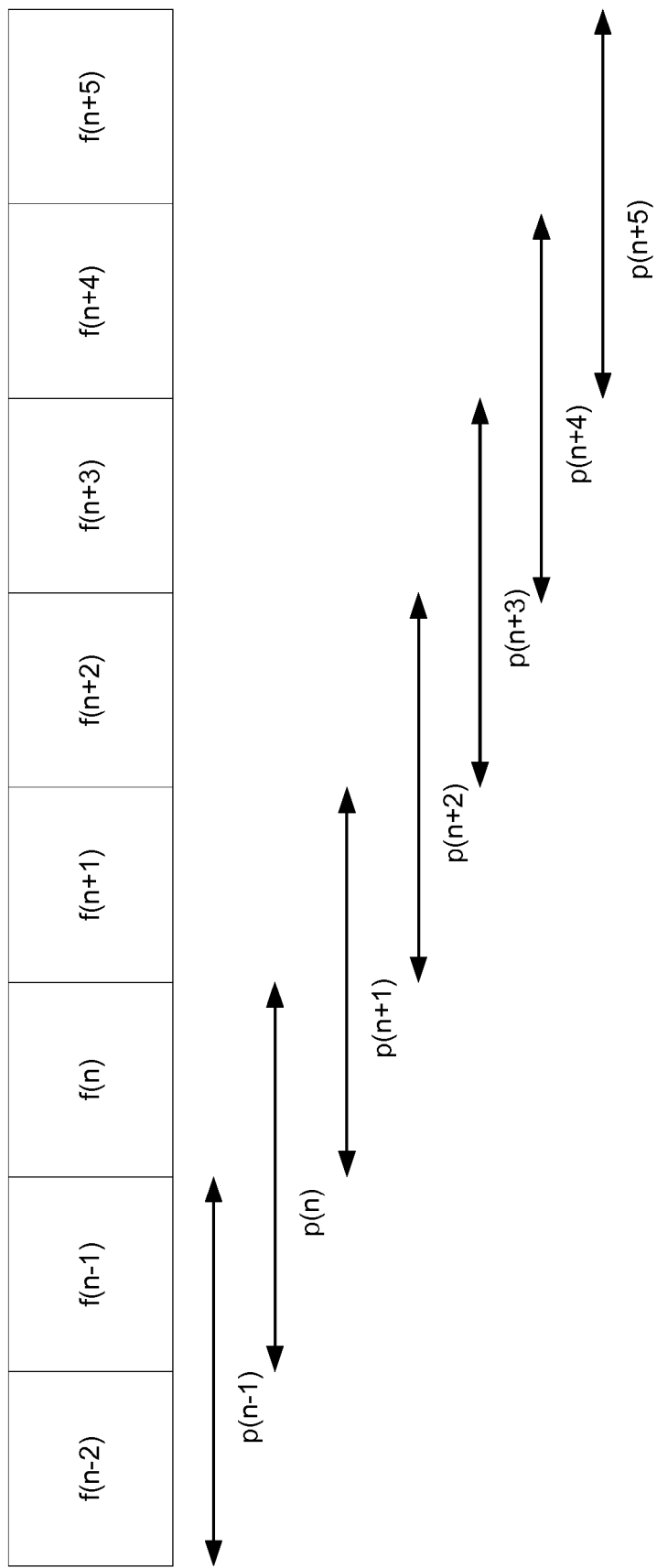
FIG. 8 illustrates bundling of real time data according to some example embodiments.

While the real time data redundancy scheme is enabled, the edge node can continue to package an immediately previously sent real time data frame (or frames) with a next sequential unsent real time data frame (or frames). FIG. 8 illustrates the effect of such bundling over a series of real time data frames according to some example embodiments. In this regard, frame f(n−2), which may have been previously sent can be bundled with next sequential unsent frame f(n−1) in packet p(n−1). The next packet, p(n) can include a bundling of the redundant transmission of frame f(n−1) along with the next sequential unsent frame, f(n). Packet p(n+1) can include frame f(n) and frame f(n+1). Packet p(n+2) can include frame f(n+1) along with the next sequential unsent frame, f(n+2). Packet p(n+3) can include frame f(n+2) along with the next sequential unsent frame, f(n+3). Packet p(n+4) can include frame f(n+3) along with the next sequential unsent frame, f(n+4). Packet p(n+5) can include frame f(n+4) along with the next sequential unsent frame, f(n+5). This procedure can continue for any additional frames as long as redundancy is enabled.

It will be appreciated that FIG. 8 is provided by way of example of embodiments in which two real time data frames can be bundled in an RTP packet. The techniques of FIG. 8 can be extended mutatis mutandis to embodiments in which three or more real time data frames (e.g., two or more previously sent real time data frames and/or two or more new real time data frames) may be packaged in an RTP packet within the scope of the disclosure.

An edge node can continue to perform redundant transmission of real time data while the real time data session is ongoing and radio link condition is sufficient to support redundant transmission of real time data. Should radio link conditions deteriorate to where redundancy can no longer be supported, such as if an MCS level has been downgraded to where a sufficient transport block size is no longer available, an edge node can decide to discontinue redundant real time data transmission. If usage of HARQ had been discontinued, HARQ can be re-enabled, such as through an RRC reconfiguration message, attendant to discontinuing usage of the real time data redundancy scheme.

Figure 9:
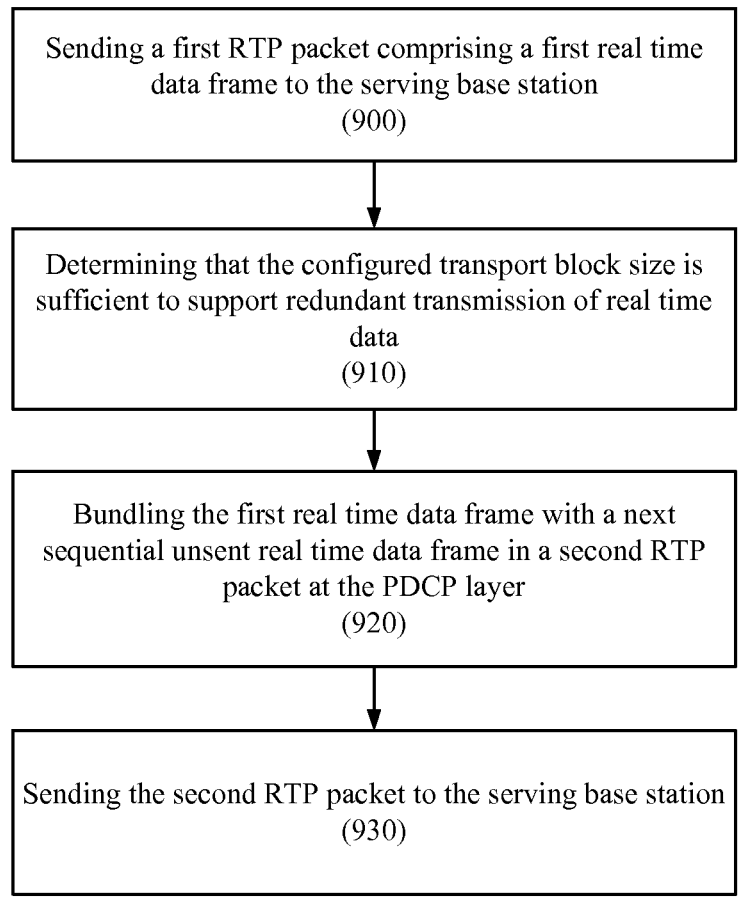
FIG. 9 illustrates a flow chart according to an example method for redundant transmission of real time data that can be performed by a wireless communication device in accordance with some example embodiments.

FIG. 9 illustrates a flow chart according to an example method for redundant transmission of real time data that can be performed by a wireless communication device, such as wireless communication device 102, in accordance with some example embodiments. In this regard, the method of FIG. 9 can correspond to an embodiment of the method of FIG. 4 in which a wireless communication device is the edge node performing the method. One or more of processing circuitry 210, processor 212, memory 214, transceiver 216, or redundancy module 218 can, for example, provide means for performing the operations illustrated in and described with respect to FIG. 9.

Operation 900 can include the wireless communication device 102 sending a first RTP packet comprising a first real time data frame to the serving base station 104. Operation 900 can accordingly, for example, correspond to an embodiment of operation 400.

Operation 910 can include the wireless communication device 102 determining that the configured transport block size is sufficient to support redundant transmission of real time data. For example, operation 910 can include determining that an allocated MCS level supports bundling two or more real time data frames in an RTP packet without using an additional physical resource block. The determination of operation 910 can, for example, be based at least in part on a size of a real time data frame given a codec(s) being used, such as described with respect to FIG. 5. Operation 910 can, for example, correspond to an embodiment of operation 410.

Operation 920 can include the wireless communication device 102 bundling the first real time data frame with a next sequential unsent real time data frame in a second RTP packet. The bundling of operation 920 can, for example, be performed at the PDCP layer. In this regard, operation 920 can, for example, correspond to an embodiment of operation 420.

Operation 930 can include the wireless communication device 102 sending the second RTP packet to the serving base station 104. In this regard, operation 930 can, for example, correspond to an embodiment of operation 430.

Figure 10:
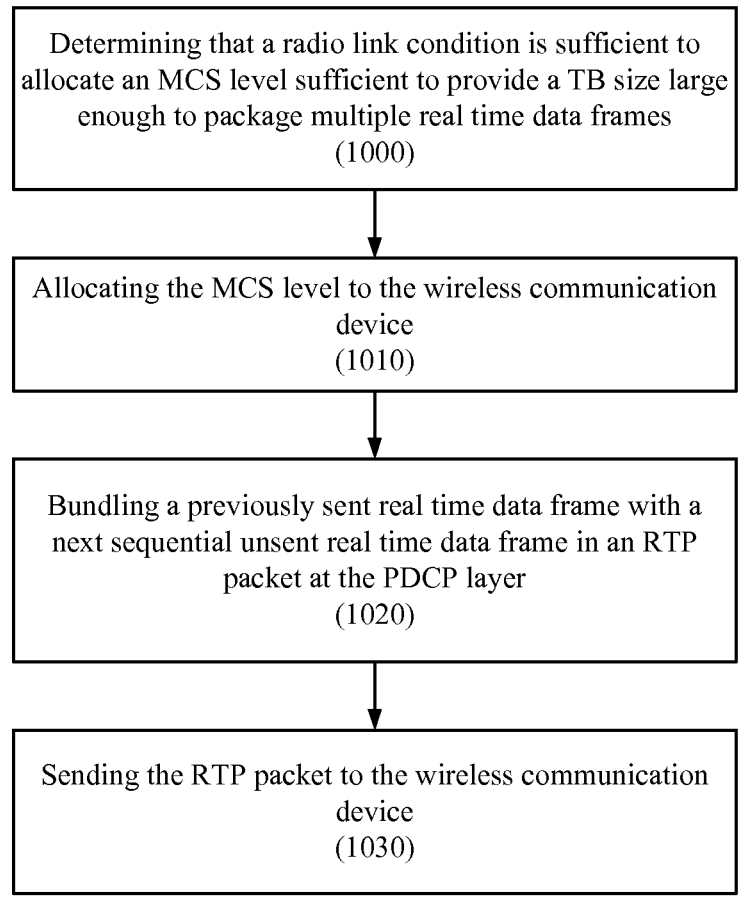
FIG. 10 illustrates a flow chart according to an example method for redundant transmission of real time data that can be performed by a base station in accordance with some example embodiments.

FIG. 10 illustrates a flow chart according to an example method for redundant transmission of real time data that can be performed by a base station, such as serving base station 104, in accordance with some example embodiments. In this regard, the method of FIG. 10 can correspond to an embodiment of the method of FIG. 10 in which a base station is the edge node performing the method. One or more of processing circuitry 310, processor 312, memory 314, transceiver 316, redundancy module 318, or scheduling module 320 can, for example, provide means for performing the operations illustrated in and described with respect to FIG. 10.

Operation 1000 can include the base station determining that a radio link condition is sufficient to allocate an MCS level sufficient to provide a transport block size that is large enough to package multiple real time data frames. This determination may, for example, be based on loading on the serving base station 104, available radio link resources, channel conditions that can be reported by the wireless communication device 102, and/or other radio link conditions that can be factored into MCS allocation decisions. The level of MCS that may be needed to support redundant transmission may, for example, be determined based at least in part on a size of a real time data frame given a codec(s) being used for the real time data session, such as described with respect to FIG. 5.

Operation 1010 can include the serving base station 104 allocating the MCS level (e.g., the upgraded MCS level that may support redundant transmission of real time data) to the wireless communication device 102. Operations 1000 and 1010 may, for example, correspond to an embodiment of operation 410.

In some example embodiments, the method can additionally include the serving base station 104 disabling HARQ, such as by sending the wireless communication device 102 an RRC reconfiguration message. In this regard, HARQ can be discontinued attendant to enabling redundant transmission of real time data in accordance with some example embodiments.

In embodiments in which the method of FIG. 10 comprises enabling and performing redundant transmission of real time data on the downlink (e.g., for a real time data session including transmission of real time data to the wireless communication device 102), the method can additionally include operations 1020 and 1030. However, for embodiments in which redundant transmission of real time data is only performed on the uplink (e.g., for transmission of real time data from the wireless communication device 102 to the serving base station 104), operations 1020 and 1030 can be omitted.

Operation 1020 can include the serving base station 104 bundling a previously sent real time data frame(s) with a next sequential unsent real time data frame(s) in an RTP packet. The bundling of operation 1020 can, for example, be performed at the RTP layer. In this regard, operation 1020 can, for example, correspond to an embodiment of operation 420.

Operation 1030 can include the serving base station 104 sending the second RTP packet to the wireless communication device 102. In this regard, operation 1030 can, for example, correspond to an embodiment of operation 430.

Figure 11:
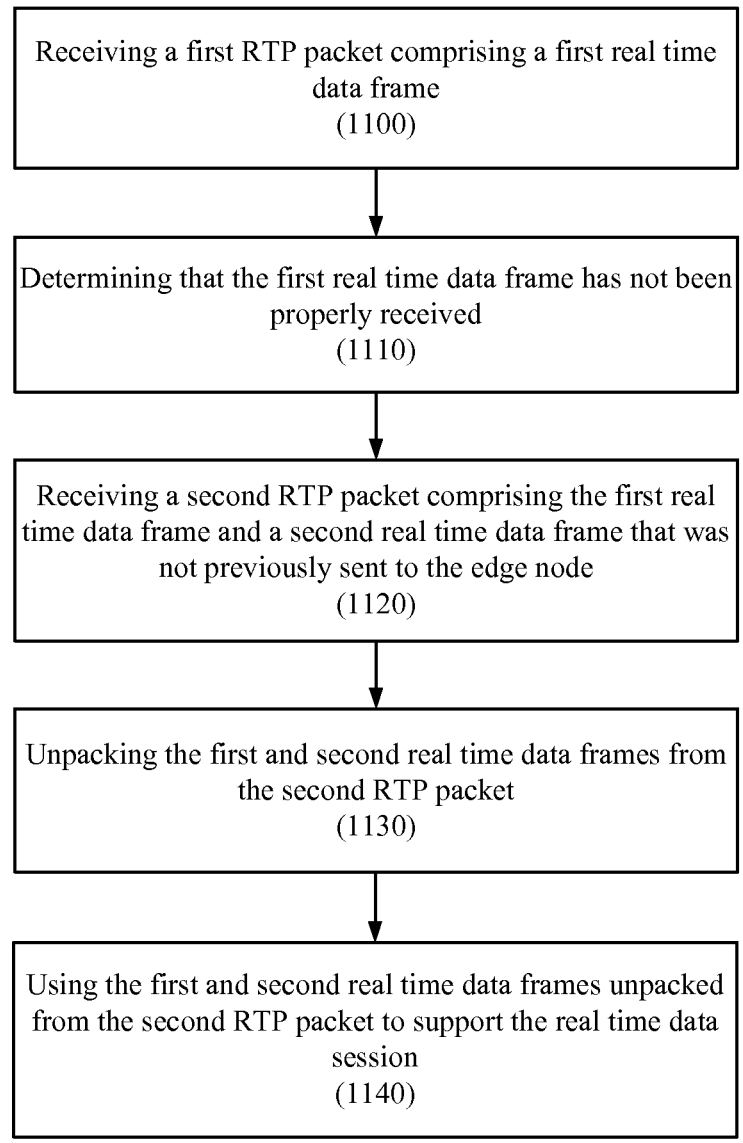
FIG. 11 illustrates a flow chart according to an example method for using redundantly transmitted real time data to support a real time data session that can be performed by an edge node in accordance with some example embodiments.

FIG. 11 illustrates a flow chart according to an example method for using redundantly transmitted real time data to support a real time data session that can be performed by an edge node, such as wireless communication device 102 and/or serving base station 104, in accordance with some example embodiments. One or more of processing circuitry 210, processor 212, memory 214, transceiver 216, redundancy module 218, processing circuitry 310, processor 312, memory 314, transceiver 316, redundancy module 318, or scheduling module 320 can, for example, provide means for performing the operations illustrated in and described with respect to FIG. 11.

Operation 1100 can include an edge node receiving a first RTP packet comprising a first real time data frame. The first real time data frame can comprise any real time data, such as, real time audio, real time video, some combination thereof, and/or some other form of real time data for a real time data session in which the edge nodes may be participating. The first RTP packet can be a packet for any real time data session, such as, by way of non-limiting example, a real time audio session (e.g., a VoLTE call or other VoIP session), a real time video session (e.g., a video call, video conference, real time streaming video, and/or the like), and/or other real time data session in which the edge node may be participating.

Operation 1110 can include the edge node determining that the first real time data frame has not been properly received. For example, operation 1110 can include determining that the first real time data frame was corrupted (e.g., during transmission and/or when unpacking the first RTP packet). For example, in some embodiments, the determination that the first real time data frame can be performed based at least in part on a checksum calculation for the first RTP packet.

Operation 1120 can include the edge node receiving a second RTP packet, which can include the first real time data frame (e.g., a redundant transmission of the first real time data frame) and a second real time data frame that was not previously sent to the edge node. Operation 1130 can include the edge node unpacking the first and second real time data frames from the second RTP packet.

Operation 1140 can include the edge node using the first and second real time data frames unpacked from the second RTP packet to support the real time data session. In this regard, the redundant transmission of the first real time data frame may be used in place of the first transmission of the first real time data frame, which was not properly received, to maintain continuity of the real time data session. It will be appreciated that the techniques of the example of FIG. 11 may be applied mutatis mutandis to instances in which the first RTP packet is not received at all, such as where the first RTP packet is dropped in transmission.

It will be appreciated that the techniques described herein for real time data redundancy can be applied mutatis mutandis to entire real time data packets, fractional data packets (e.g., a half or other fractional duration of a normal speech or other real time data packet), compressed real time data packets (e.g., lower quality speech or other real time data packet, but standard duration), and/or other redundant real time data that can be inserted into otherwise unused transport block space.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for redundant transmission of real time data, the method comprising:
by an edge node in a wireless network:
sending a first real-time transport protocol (RTP) packet to a second edge node, wherein the first RTP packet comprises a first real time data frame;
determining that a radio link condition is sufficient to support redundant transmission of real time data to the second edge node; and
in response to determining that the radio link condition is sufficient to support redundant transmission of real time data, wherein the radio link condition is sufficient when radio resource allocation allows bundling together two or more real time data frames in a single transport block:
bundling the previously sent first real time data frame with a next sequential real time data frame in a second RTP packet at a packet data convergence protocol (PDCP) layer of the edge node, wherein the next sequential real time data frame has not been previously sent to the second edge node; and
sending the second RTP packet comprising redundant transmission of the first real time data frame to the second edge node.

2. The method of claim 1, further comprising the edge node, for each RTP packet sent to the second node while the radio link condition is sufficient to support redundant transmission of real time data, bundling at least one previously sent real time data frame and at least one real time data frame that has not been sent to the second edge node.

3. The method of claim 1, wherein the wireless network comprises a Long Term Evolution (LTE) network, and wherein the first real time data frame and the next sequential real time data frame comprise speech frames for a voice over LTE (VoLTE) call.

4. The method of claim 1, wherein the first real time data frame and the next sequential real time data frame comprise frames of video data for a real time video session.

5. The method of claim 1, wherein the edge node is a wireless communication device and the second edge node is a base station serving the wireless communication device.

6. The method of claim 5, wherein determining that the radio link condition is sufficient to support redundant transmission of real time data comprises the wireless communication device determining that a transport block (TB) size large enough to enable bundling two real time data frames in a single RTP packet has been allocated to the wireless communication device.

7. The method of claim 1, wherein the edge node is a base station and the second edge node is a wireless communication device served by the base station.

8. The method of claim 7, wherein determining that the radio link condition is sufficient to support redundant transmission of real time data comprises the base station determining that the radio link condition is sufficient to allocate a modulation and coding scheme (MCS) level sufficient to provide a transport block (TB) size large enough to enable bundling two real time data frames in a single RTP packet to the wireless communication device, the method further comprising the base station:
allocating the MCS level to the wireless communication device.

9. The method of claim 1, further comprising the edge node discontinuing use of hybrid automatic repeat request (HARQ) attendant to performing redundant transmission of real time data.

10. The method of claim 1, further comprising the edge node performing redundant transmission of real time data without notifying the second edge node.

11. The method of claim 1, further comprising the edge node signaling the second edge node to indicate that the edge node is going to perform redundant transmission of real time data prior to sending the second RTP packet.

12. An edge node comprising:
a transceiver configured to send wireless signals to and receive wireless signals from a second edge node in a wireless network; and
processing circuitry coupled with the transceiver, wherein the processing circuitry is configured to cause the edge node to at least:
send a first real-time transport protocol (RTP) packet to the second edge node, wherein the first RTP packet comprises a first real time data frame;
determine that a radio link condition is sufficient to support redundant transmission of real time data to the second edge node, wherein the radio link condition is sufficient when radio resource allocation allows bundling together two or more real time data frames in a single transport block; and
in response to determining that the radio link condition is sufficient to support redundant transmission of real time data:
bundle the previously sent first real time data frame with a next sequential real time data frame in a second RTP packet at a packet data convergence protocol (PDCP) layer of the edge node, wherein the next sequential real time data frame has not been previously sent to the second edge node; and
send the second RTP packet comprising redundant transmission of the first real time data frame to the second edge node.

13. The edge node of claim 12, wherein the wireless network comprises a Long Term Evolution (LTE) network, and wherein the first real time data frame and the next sequential real time data frames comprise speech frames for a voice over LTE (VoLTE) call.

14. The edge node of claim 12, wherein the edge node is a wireless communication device and the second edge node is a base station serving the wireless communication device.

15. The edge node of claim 14, wherein the processing circuitry is further configured to cause the edge node to determine that the radio link condition is sufficient to support redundant transmission of real time data at least in part by causing the edge node to determine that a transport block (TB) size large enough to enable bundling two real time data frames in a single RTP packet has been allocated to the edge node.

16. The edge node of claim 12, wherein the edge node is a base station and the second edge node is a wireless communication device served by the base station.

17. The edge node of claim 16, wherein the processing circuitry is further configured to cause the edge node to:
    determine that the radio link condition is sufficient to support redundant transmission of real time data at least in part by causing the edge node to determine that the radio link condition is sufficient to allocate a modulation and coding scheme (MCS) level sufficient to provide a transport block (TB) size large enough to enable bundling two real time data frames in a single RTP packet to the wireless communication device; and
    allocate the MCS level to the wireless communication device.

18. A non-transitory computer readable storage medium having computer program code stored thereon, the computer program code comprising program code, which, when executed by one or more processors implemented on an edge node in a wireless network, is configured to cause the edge node to perform a method comprising:
    sending a first real-time transport protocol (RTP) packet to a second edge node, wherein the first RTP packet comprises a first real time data frame;
    determining that a radio link condition is sufficient to support redundant transmission of real time data to the second edge node, wherein the radio link condition is sufficient when radio resource allocation allows bundling together two or more real time data frames in a single transport block; and
    in response to determining that the radio link condition is sufficient to support redundant transmission of real time data:
        bundling the previously sent first real time data frame with a next sequential real time data frame in a second RTP packet at a packet data convergence protocol (PDCP) layer of the edge node, wherein the next sequential real time data frame has not been previously sent to the second edge node; and
        sending the second RTP packet comprising redundant transmission of the first real time data frame to the second edge node.

19. The non-transitory computer readable storage medium of claim 18, wherein the edge node is a wireless communication device and the second edge node is a base station serving the wireless communication device.

20. The non-transitory computer readable storage medium of claim 18, wherein the edge node is a base station and the second edge node is a wireless communication device served by the base station.

\* \* \* \* \*